United States Patent
Colombo et al.

(10) Patent No.: US 10,717,663 B2
(45) Date of Patent: Jul. 21, 2020

(54) CHEMICAL DENITRIFICATION OF CONTAMINATED WATER

(71) Applicant: Chemical Systems of Orlando, Inc., Zellwood, FL (US)

(72) Inventors: Russel Gerald Colombo, Zellwood, FL (US); Gary Bryon Loughmiller, Zellwood, FL (US)

(73) Assignee: Chemical Systems of Orlando, Inc., Zellwood, FL (US)

( * ) Notice: Subject to any disclaimer, the term of this patent is extended or adjusted under 35 U.S.C. 154(b) by 80 days.

(21) Appl. No.: 16/162,994

(22) Filed: Oct. 17, 2018

(65) Prior Publication Data
US 2019/0263692 A1    Aug. 29, 2019

Related U.S. Application Data

(60) Provisional application No. 62/635,691, filed on Feb. 27, 2018.

(51) Int. Cl.
    *C01F 7/02*      (2006.01)
    *C02F 1/58*      (2006.01)
    (Continued)

(52) U.S. Cl.
    CPC .................. *C02F 1/66* (2013.01); *C02F 1/58* (2013.01); *C01F 7/02* (2013.01); *C01P 2004/61* (2013.01); *C02F 2101/163* (2013.01); *C02F 2103/06* (2013.01); *C02F 2201/002* (2013.01); *C02F 2209/06* (2013.01)

(58) Field of Classification Search
    CPC ...... C02F 7/02; C02F 1/58; C02F 1/66; C02F 1/705; C02F 2101/163; C02F 2103/06; C02F 2201/002; C02F 2209/06; C01P 2004/61
    See application file for complete search history.

(56) References Cited

U.S. PATENT DOCUMENTS 3,617,579 A    11/1971  Gunderloy, Jr. et al.
4,990,266 A     2/1991  Vorlop et al.
               (Continued)

FOREIGN PATENT DOCUMENTS

CN    103693729 A    4/2014
CN    106219716 A   12/2016
               (Continued)

OTHER PUBLICATIONS

Bertoch et al; "Catalytic Nitrate Removal in a Trickle Bed Reactor: Direct Drinking Water Treatment"; Journal American Water Works Association; vol. 109, 5; May 2017.
(Continued)

*Primary Examiner* — Lucas A Stelling
(74) *Attorney, Agent, or Firm* — Christopher M. Ramsey; GrayRobinson, P.A.

(57) ABSTRACT

Soluble nitrogen-containing species are removed from contaminated water by contacting the contaminated water with aluminum oxide particles in a reactor and adding sufficient sulfamic acid to the reactor to adjust the pH of the contaminated water to 5 or below to create treated water. The treated water, which has less of the soluble nitrogen-containing species than the contaminated water, is removed from the reactor.

24 Claims, 3 Drawing Sheets

(51) Int. Cl.
*C02F 1/66* (2006.01)
*C02F 1/70* (2006.01)
*C02F 101/16* (2006.01)
*C02F 103/06* (2006.01)

(56) References Cited

U.S. PATENT DOCUMENTS

| | | | |
|---|---|---|---|
| 5,069,800 A | | 12/1991 | Murphy |
| H1126 H | | 1/1993 | Pan et al. |
| 5,679,239 A | * | 10/1997 | Blum ........................ C02F 1/766 205/556 |
| 6,030,520 A | | 2/2000 | Dziewinski et al. |
| 6,436,275 B1 | | 8/2002 | Dziewinski et al. |
| 6,716,366 B2 | | 4/2004 | Waldmann |
| 6,761,828 B2 | | 7/2004 | Heuser et al. |
| 2015/0021267 A1 | | 1/2015 | Choo |

FOREIGN PATENT DOCUMENTS

| | | |
|---|---|---|
| ES | 2265268 A1 | 2/2007 |
| IN | 222102 | 6/2005 |
| JP | 2003290758 A | 10/2003 |
| KR | 796098 | 1/2008 |
| WO | 1997000719 A1 | 1/1997 |
| WO | 9847818 A1 | 10/1998 |

OTHER PUBLICATIONS

Ferro, Sergio; Removal of Nitrates from Highly-Contaminated Industrial Wastewater; Critical Reviews; https://www.researchgate.net/publication/271074701; Mar. 22, 2018.

International Search Report dated May 6, 2019 for PCT/US19/18667.

Jang et al; "Denitrification of Simulated Nitrate-Rich Wastewater Using Sulfamic Acid and Zinc Scrap"; Chemical Papers—Slovak Academy of Sciences; Aug. 2011; vol. 65, pp. 437-446; pp. 437, Abstract, p. 438, right col., para 2-3; p. 443, Fig. 6.

Sabzali et al.; "Chemical Denitrification of Nitrate from Groundwater Via Sulfamic Acid and Zinc Metal"; Iran J. Environ Health Science. Eng.; vol. 3, No. 3; pp. 141-146; 2006.

\* cited by examiner

CHEMICAL DENITRIFICATION OF CONTAMINATED WATER

CROSS-REFERENCE TO RELATED APPLICATION

This claims the benefit of priority to U.S. provisional Application No. 62/635,691, filed Feb. 27, 2018, which is incorporated by reference in its entirety.

BACKGROUND

Field

This pertains to the field of water treatment and, more particularly, to removing soluble nitrogen-containing species from contaminated water.

Background

Nitrogen containing chemicals such as nitrates are common pollutants found in groundwater. Because nitrates are unsafe to drink, nitrate contaminated water must be treated to remove the nitrates before the water is usable as drinking water. In addition, various forms of nitrogen act as nutrients that lead to algae growth in surface water such as lakes and rivers causing fish kills, loss of use, and other problems. Regulatory agencies around the world have set limits on the acceptable amount of nitrates and other forms of nitrogen in drinking water and surface water.

There are several conventional techniques to remove nitrates from contaminated water. In the first technique, the water is treated with organisms such as bacteria that biologically remove the nitrates from the water. This technique has the drawback of risking exposure of people to bacteria. In the second technique, ion exchange is used. This technique has the drawback of generating unwanted by-products.

BRIEF SUMMARY

In view of the foregoing, it would be useful to have an improved system and method for removing nitrogen-containing species from contaminated water.

A first exemplary method includes removing soluble nitrogen-containing species from contaminated water by: contacting the contaminated water with aluminum oxide particles in a reactor; adjusting a pH of the contaminated water to 5 or below to create treated water by adding sulfamic acid to the reactor; and removing treated water from the reactor, the treated water having less of the soluble nitrogen-containing species than the contaminated water.

Such a method may include one or more of the following features. The method where the aluminum oxide particles have a size of 0.1 mm to 10 mm. The method where the aluminum oxide particles have a size of 0.5 mm to 5 mm. The method where the aluminum oxide particles have a size of 1 mm to 3 mm. The method further including adding a base to the contaminated water prior to the contaminated water entering the reactor. The method where the pH of the contaminated water is at least 10 prior to entering the reactor. The method where the reactor has a top and a bottom, and the contaminated water and sulfamic acid are introduced into the reactor at the bottom. The method where the sulfamic acid is sufficient to adjust the pH to 2 or below.

A second exemplary method includes providing a contaminated water stream including contaminated water with soluble nitrogen-containing species to a reactor having aluminum oxide particles therein; introducing sulfamic acid into the reactor through a sulfamic acid inlet on the reactor; operating a controller that controls an amount of sulfamic acid provided into the reactor; and removing a treated water stream containing treated water having less of the soluble nitrogen-containing species than the contaminated water from the reactor, the treated water stream being downstream from the reactor.

Such a method may include one or more of the following features. The method where the reactor includes a contaminated water inlet at a bottom of the reactor and a treated water outlet at a top of the reactor. The method where the sulfamic acid inlet is adjacent a contaminated water inlet of the reactor at a bottom of the reactor. The method where the controller stores program instructions to adjust a pH of the contaminated water in the reactor to 0.1 to 5. The method where the controller stores program instructions to adjust a pH of the contaminated water in the reactor to 2 or below. The method where the aluminum oxide particles have a size of 0.1 mm to 10 mm. The method where the aluminum oxide particles have a size of 0.5 mm to 5 mm. The method where the aluminum oxide particle have a size of 1 mm to 3 mm.

An exemplary water treatment system includes a reactor having aluminum oxide particles therein positioned to receive a contaminated water stream including contaminated water with soluble nitrogen-containing species; a sulfamic acid inlet on the reactor for providing sulfamic acid into the reactor; a controller that controls an amount of sulfamic acid provided into the reactor; and a treated water stream containing treated water having less of the soluble nitrogen-containing species than the contaminated water, the treated water stream being downstream from the reactor.

The water treatment system may include one or more of the following features. The water treatment system where the reactor includes a contaminated water inlet at a bottom of the reactor and a treated water outlet at a top of the reactor. The water treatment system where the sulfamic acid inlet is adjacent a contaminated water inlet of the reactor at a bottom of the reactor. The water treatment system where the controller stores program instructions to adjust a pH of the contaminated water in the reactor to 0.1 to 5. The water treatment system where the controller stores program instructions to adjust a pH of the contaminated water in the reactor to 2 or below. The water treatment system where the aluminum oxide particles have a size of 0.1 mm to 10 mm. The water treatment system where the aluminum oxide particles have a size of 0.5 mm to 5 mm. The water treatment system where the aluminum oxide particles have a size of 1 mm to 3 mm.

DETAILED DESCRIPTION OF EXAMPLE EMBODIMENTS

Figure 1:
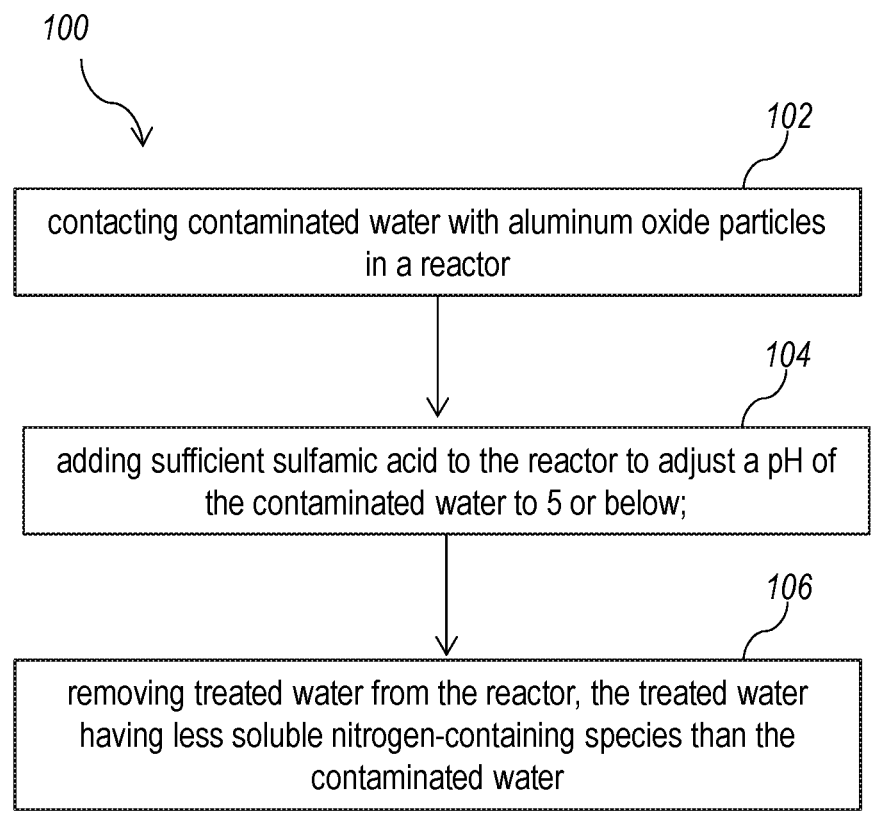
FIG. 1 is a flow diagram of an example method for removing soluble nitrogen-containing species from contaminated water.

Details of an example of the water treatment method are first described with reference to FIG. 1. The water treatment method 100 may be used to denitrify, or remove nitrogen-containing species from, water contaminated with nitrogen-containing species. Such nitrogen-containing species may include nitrates, nitrites, and/or amines, for example.

At block 102 contaminated water is contacted with aluminum oxide particles in a reactor. The contaminated water includes nitrogen-containing species to be removed through the treatment method. The nitrogen-containing species may be in soluble form in the contaminated water and, therefore, not removable by conventional mechanical filtering techniques.

The aluminum oxide ($Al_2O_3$) particles are in particulate form to provide a large surface area to make the denitrification reactions proceed. Aluminum oxide ($Al_2O_3$) is a reducing agent for nitrates. The particles may have a size range of 0.1 mm to 10 mm, 0.5 mm to 5 mm, 1 mm to 3 mm, 4 mesh to 12 mesh, 5 mesh to 11 mesh, 6 mesh to 10 mesh, or 7 mesh to 9 mesh. In a particular example, the particles are 8 mesh in size. In experiments, the size of the particles did not affect removal of nitrogen-containing species. In some cases, depending on the reactor design, it may be advantageous to select aluminum oxide particles that are large enough to remain in the reactor and not be entrained in treated water exiting the reactor.

Because the particles in a given sample of aluminum oxide are not necessarily uniform, the particle size refers to the median particle size in the sample. The particle size may be measured by a standard commercial mesh measurement technique. Where the particle size is expressed in terms of mm, the number of mm has a corresponding mesh size.

In some examples of the method it may be desirable to use other metal-containing particles in combination with the aluminum oxide. Examples of other metal-containing particles may include zinc, zinc oxide, palladium, aluminum or the like.

The reactor may be a container in which the aluminum oxide particles are stored. The construction of the reactor can vary depending on the scale of the operation and volume of contaminated water to be treated. Examples of reactors may include, but are not limited to, tanks, vessels, pipes, and the like.

The contaminated water may be contacted with the aluminum oxide particles in the reactor in different ways. In one example, the contaminated water is flowed into the reactor where the aluminum oxide particles are already present. The contaminated water then flows around the aluminum oxide particles and through the interstices between the particles to provide a large surface area of aluminum oxide in direct contact with the contaminated water. In another example, the contaminated water is introduced into the reactor and the aluminum oxide particles are then added to the reactor.

At block 104, sufficient sulfamic acid is added to the reactor until the pH of the contaminated water in the reactor is 5 or below or from 0.1 to 5. The amount of sulfamic acid sufficient to achieve this pH range will depend on the volume of contaminated water being treated and the pH of the contaminated water when it is introduced to the reactor. If the volume is large or the pH is high, more sulfamic acid will need to be added. In order to determine the pH of the contaminated water in the reactor, the pH may be monitored with an pH meter installed in the reactor or by manual pH measurements. While monitoring the pH sulfamic acid may be added until the desired pH value is reached. Sulfamic acid may be added incrementally until the desired pH is achieved. In some examples, the desired pH is 0.1 to 7, 0.1 to 5, 5 or below, 0.5 to 4, 0.5 to 3, 1 to 3, or 2 or below.

The solution in the reactor at this stage includes the contaminated water, aluminum oxide particles, and sulfamic acid. This solution is allowed to react. During the reaction, the nitrogen-containing species in the contaminated water are turned into a gaseous nitrogen-containing reaction product that can either escape to the atmosphere or be collected. The remaining solution with less of the soluble nitrogen-containing species is called treated water.

At block 106, the treated water is removed from the reactor. Removing the treated water from the reactor may be achieved by allowing the treated water to flow out of the reactor, which may be accomplished by allowing it to exit through a conduit attached to the reactor, pouring it out of the reactor, or the like.

If, prior to being introduced into the reactor, the pH of the contaminated water is below 7, it may sometimes be beneficial to adjust the pH upwards by adding a sufficient amount of base to the contaminated water to raise the pH to the desired level. There are many suitable bases that can be used for this purpose. Hydroxides such as sodium hydroxide and potassium hydroxide are examples, but there are many other possibilities that are not listed here. The resulting pH level of the contaminated water may be 7 to 14, 8 to 13, 9 to 12, 10 to 11, or at least 10. In a particular example, the pH of the base-treated contaminated water is about 10.25.

In some situations, it may be desirable to mix the contaminated water with hydrogen peroxide prior to introducing it into the reactor. If the contaminated water includes substantial nitrites, the hydrogen peroxide will convert the nitrite to nitrates, which can be more efficiently converted to the gaseous nitrogen-containing species to be removed in the treatment method.

Figure 2:
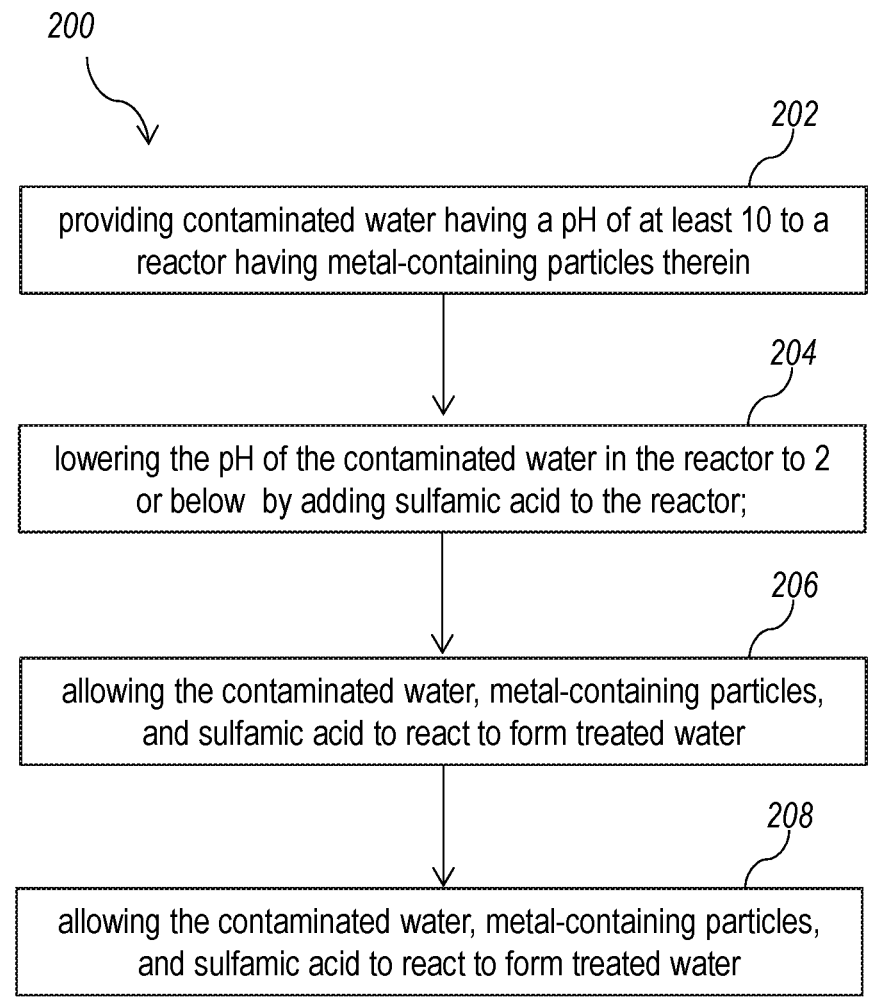
FIG. 2 is a flow diagram of another example method for removing soluble nitrogen-containing species from contaminated water.

A more particular example of the water treatment method 200 is now described with reference to FIG. 2. This method may be performed using the details discussed above in connection with FIG. 1. At block 202, contaminated water having a pH greater than 7 is provided to the reactor having aluminum oxide particles in it. At block 204, the pH of the contaminated water is adjusted in the reactor to 2 or below by adding the sulfamic acid to the reactor. At block 206, the contaminated water, metal-containing particles, and sulfamic acid are allowed to react to form the treated water. The treated water is then removed from the reactor.

A water treatment system 300 that may be used to practice the water treatment methods is now described with reference to FIG. 3.

The system 300 includes a treatment water source 202 from which the contaminated water comes. The treatment water source may be any source of water contaminated with nitrogen-containing species such as for example, wastewater from an industrial process or environmental runoff. Contaminated water from the treatment water source flows along a contaminated water stream 304.

If needed, the base is provided to the contaminated water stream 304 from a base supply 306. The base supply 306 includes a container containing the base used to adjust the pH of the contaminated water. The base supply is in fluid communication with a base supply valve 308 positioned along the contaminated water stream 304.

The base supply valve 308 regulates the flow of base into the contaminated water stream 304. The base supply valve may be controlled manually and/or electronically. A pH meter may be positioned along the contaminated water stream 304 in order to monitor the pH of the contaminated water as the base is added thereto.

Downstream from the base supply valve 308 is a base-treated stream 310 that feeds base-treated contaminated water to the reactor 316 through a reactor inlet port 314 of the reactor 316.

Figure 3:
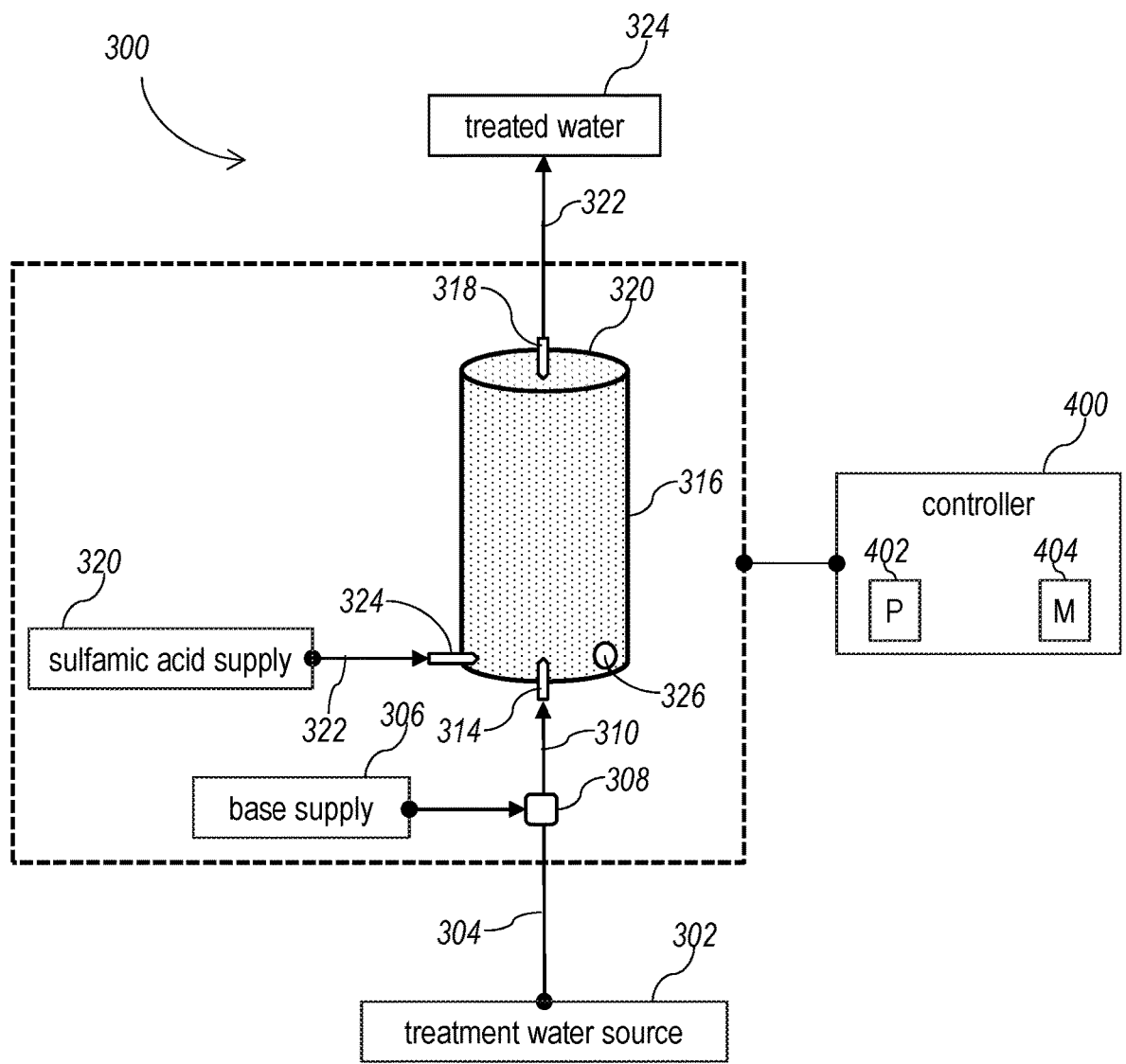
FIG. 3 is a block diagram of an example of a water treatment system.

The reactor 316 is a container containing the metal-containing particles indicated by the small dots in FIG. 3. The reactor 316 is configured with the inlet port 314 at the bottom and an outlet port 318 above the inlet port 314 and, in some examples such as that shown in FIG. 3, is positioned at or adjacent the top 320 of the reactor 316. This vertical configuration allows the reactor 316 to begin filling with contaminated water from the bottom so that nitrogen-containing contaminants are either removed or converted to gaseous species by the time the contaminated water reaches the outlet port 318.

Sulfamic acid is provided to the reactor from a sulfamic acid supply 320, which may be a container containing sulfamic acid. Sulfamic acid from the sulfamic acid supply is fed to the reactor via a sulfamic acid stream 322 through a sulfamic acid inlet port 324 positioned at the bottom of the reactor 316 proximal to the contaminated water inlet port 314. The sulfamic acid inlet port 324 may include a valve for regulating the flow of sulfamic acid. This configuration allows the sulfamic acid to come into contact with the contaminated water at the bottom of the reactor 316, which demonstrates an unexpected advantage.

A pH meter 326 is positioned within the reactor 316 at about the vertical level of the sulfamic acid inlet port 324 for measuring the pH of the contaminated water as the sulfamic acid is fed into the reactor 316. This configuration allows for precise control over the pH of the contaminated water. By monitoring the pH at or near the bottom of the reactor 316, the amount of sulfamic acid may be adjusted to achieve the desired pH, which was discussed above.

The outlet port 318 feeds the treated water 324 through a treated water stream 322. The treated water 324 contains less nitrogen-containing contaminants than the contaminated water. Because the pH of the treated water may be acidic, the pH of the treated water may, if necessary, be raised by adding a base such as lime, a hydroxide, or the like.

The treated water 324 may be fed to local sewage or water treatment plants for recycling into potable water or it may be used for other purposes as desired.

It is to be understood that the various streams described in connection with the system 300 may be made from conventional piping and/or tubing used in chemical processes and may be selected based on the properties of the liquid that flows therethrough.

A controller 400 including at least one computer processor 402 capable of executing program instructions stored on a non-transitory computer memory medium 404 is connected to parts of the system 400 for controlling the flow of chemicals, opening and closing valves, and monitoring and controlling pH levels. The memory 404 may include program instructions to operate the system to practice the water treatment method described above.

The system and methods are not limited to the details described in connection with the example embodiments. There are numerous variations and modification of the compositions and methods that may be made without departing from the scope of what is claimed. The scope of the claims is not limited to the examples or details described here.

That which is claimed is:

1. A method comprising removing soluble nitrogen-containing species from contaminated water by:

adding a base to the contaminated water;
contacting the contaminated water with aluminum oxide particles in a reactor after adding the base to the contaminated water;
adjusting a pH of the contaminated water to 5 or below to create treated water by adding sulfamic acid to the reactor; and
removing treated water from the reactor, the treated water having less of the soluble nitrogen-containing species than the contaminated water.

2. The method of claim 1, wherein the aluminum oxide particles have a size of 0.1 mm to 10 mm.

3. The method of claim 1, wherein the aluminum oxide particles have a size of 0.5 mm to 5 mm.

4. The method of claim 1, wherein the aluminum oxide particles have a size of 1 mm to 3 mm.

5. The method of claim 1, further comprising adding a base to the contaminated water prior to the contaminated water entering the reactor.

6. The method of claim 1, wherein the pH of the contaminated water is at least 10 prior to entering the reactor.

7. The method of claim 1, wherein the reactor has a top and a bottom, and the contaminated water and sulfamic acid are introduced into the reactor at the bottom.

8. The method of claim 1, wherein the sulfamic acid is sufficient to adjust the pH to 2 or below.

9. A water treatment system comprising:

a contaminated water stream with a soluble nitrogen-containing species, and having a pH of at least 10;
a reactor having aluminum oxide particles therein positioned to receive the contaminated water stream;
a sulfamic acid inlet on the reactor for providing sulfamic acid into the reactor;
a controller that controls an amount of sulfamic acid provided into the reactor; and
a treated water stream containing treated water having less of the soluble nitrogen-containing species than the contaminated water, the treated water stream being downstream of the reactor.

10. The water treatment system of claim 9, wherein the reactor includes a contaminated water inlet at a bottom of the reactor and a treated water outlet at a top of the reactor.

11. The water treatment system of claim 9, wherein the sulfamic acid inlet is adjacent a contaminated water inlet of the reactor at a bottom of the reactor.

12. The water treatment system of claim 9, wherein the controller stores program instructions to adjust a pH of the contaminated water in the reactor to 0.1 to 5.

13. The water treatment system of claim 9, wherein the controller stores program instructions to adjust a pH of the contaminated water in the reactor to 2 or below.

14. The water treatment system of claim 9, wherein the aluminum oxide particles have a size of 0.1 mm to 10 mm.

15. The water treatment system of claim 9, wherein the aluminum oxide particles have a size of 0.5 mm to 5 mm.

16. The water treatment system of claim 9, wherein the aluminum oxide particles have a size of 1 mm to 3 mm.

17. A method comprising:

(a) adding a base to contaminated water having soluble nitrogen-containing species therein;
(b) providing a contaminated water stream, having a pH of at least 10, the contaminated water stream including the contaminated water from (a) to a reactor having aluminum oxide particles therein;
(c) introducing sulfamic acid into the reactor through a sulfamic acid inlet on the reactor;
(d) operating a controller that controls an amount of sulfamic acid provided into the reactor; and (e) removing a treated water stream containing treated water having less of the soluble nitrogen-containing species than the contaminated water from the reactor, the treated water stream being downstream from the reactor.

18. The method of claim 17, wherein the reactor includes a contaminated water inlet at a bottom of the reactor and a treated water outlet at a top of the reactor.

19. The method of claim 17, wherein the sulfamic acid inlet is adjacent a contaminated water inlet of the reactor at a bottom of the reactor.

20. The method of claim 17, wherein the controller stores program instructions to adjust a pH of the contaminated water in the reactor to 0.1 to 5.

21. The method of claim 17, wherein the controller stores program instructions to adjust a pH of the contaminated water in the reactor to 2 or below.

22. The method of claim 17, wherein the aluminum oxide particles have a size of 0.1 mm to 10 mm.

23. The method of claim 17, wherein the aluminum oxide particles have a size of 0.5 mm to 5 mm.

24. The method of claim 17, wherein the aluminum oxide particle have a size of 1 mm to 3 mm.

\* \* \* \* \*